Dec. 16, 1969   K. J. OSWALD   3,484,321
HEATING DEVICE FOR CURING THE ADHESIVE JOINT
BETWEEN PLASTIC PIPE SECTIONS
Filed May 27, 1966

INVENTOR
KENNETH J. OSWALD

BY
Andrus & Starke
ATTORNEYS

United States Patent Office 3,484,321
Patented Dec. 16, 1969

3,484,321
HEATING DEVICE FOR CURING THE ADHESIVE JOINT BETWEEN PLASTIC PIPE SECTIONS
Kenneth J. Oswald, Little Rock, Ark., assignor, by mesne assignments, to A. O. Smith-Inland Inc., Milwaukee, Wis., a corporation of Delaware
Filed May 27, 1966, Ser. No. 553,502
Int. Cl. C09j *3/26;* B32b *31/26*
U.S. Cl. 156—499                           11 Claims

ABSTRACT OF THE DISCLOSURE

A portable heating unit to be used to cure the thermosetting adhesive joint between plastic pipe sections. The heating unit includes a tubular metallic heating member to receive the plastic pipe sections to be joined and a pair of heat insulating strips are secured to the inner surface of the housing at each end thereof and serve to prevent direct physical contact between the heating member and the plastic pipe sections.

The heating member serves as a heat sink and heat is transferred radiantly to the plastic pipe sections to accelerate the curing of the thermosetting resin at the joint between the pipe sections.

---

This invention relates to a heating unit for curing the adhesive joint between pipe sections, and more particularly to a heating unit to be used in the field for curing the adhesive joint between plastic pipe sections.

When laying plastic pipe, such as fiber reinforced resin pipe, in the field, bell and spigot pipe joints are frequently used. With this type of joint, a resin adhesive is applied to both the bell and spigot ends and the spigot end of one pipe section is inserted within the bell end of the other pipe section and twisted to form a mechanical lock between the pipe sections. If the ambient temperature is over about 60° F., the resin adhesive will cure in a period of several hours and no auxiliary heat source is required. However, if the ambient temperature is below 60° F., the time for curing is substantially increased. Thus, when the temperature is below about 60° F., it is desirable to have an external heat source to accelerate the curing of the resin adhesive used to join the pipe sections together. Moreover, an external heat source also accelerates the curing of the resin at ambient temperatures above 60° F. so that the joined pipe sections can be put into service more quickly.

The present invention is directed to a portable heating unit to be used in the field to aid in curing the adhesive joint between plastic pipe sections. More specifically, the heating unit includes a pair of semi-cylindrical, metallic, heating members which, when mated together, form a tubular housing adapted to receive the pipe sections to be joined. A layer of heat insulating material is applied around each of the metallic heating members and a sheet metal casing confines the insulating material. To space the plastic pipe sections from the metallic heating members or halves, a heat insulating strip of asbestos or the like is secured to the inner surface at each end of each heating member and the strips serve to prevent direct physical contact between the metallic heating members and the plastic pipe sections. The heating unit also includes a wind screen which extends over the longitudinal joints between the semi-cylindrical heating members to prevent the wind from entering the joint or clearance between the heating members.

The metallic heating members serve as a heat sink and heat is transferred from the members to the plastic pipe sections to accelerate the curing of the resin adhesive at the joint between pipe sections. The heating members are not self-heated, but instead are preheated by an auxiliary gas heater, prior to positioning the pipe sections within the unit. The heating unit with the heating members in the mating or closed position is initially inserted around a vertical pipe of a gas heater having a series of gas jets which serves to heat the metallic members to a temperature in the range of 300 to 600° F. When the heating members have been heated to the desired temperature, the unit is removed from the gas heater, the heating members or halves are opened, and the pipe sections are then inserted within the opened halves. After the pipe sections are properly positioned, the heating members or halves are locked together and heat radiating from the heated metallic halves serves to cure the resin adhesive at the joint.

The heating device of the invention is particularly adaptable for use in the field when the ambient temperature falls below 60° F. Heat is applied by radiation to the resin adhesive at the joint between the pipe sections and there is no direct contact between the plastic pipe sections and the heating source, thereby preventing any possibility of scorching or burning of the plastic pipe sections. The amount of heat to be applied to the resin joint is readily controlled and since no heat is supplied directly to the heating unit once the pipe sections are inserted therein, there is no danger of overheating and the unit can be left unattended.

Other objects and advantages will appear in the course of the following description.

The drawings illustrate the best mode presently contemplated of carrying out the invention.

Figure 1:
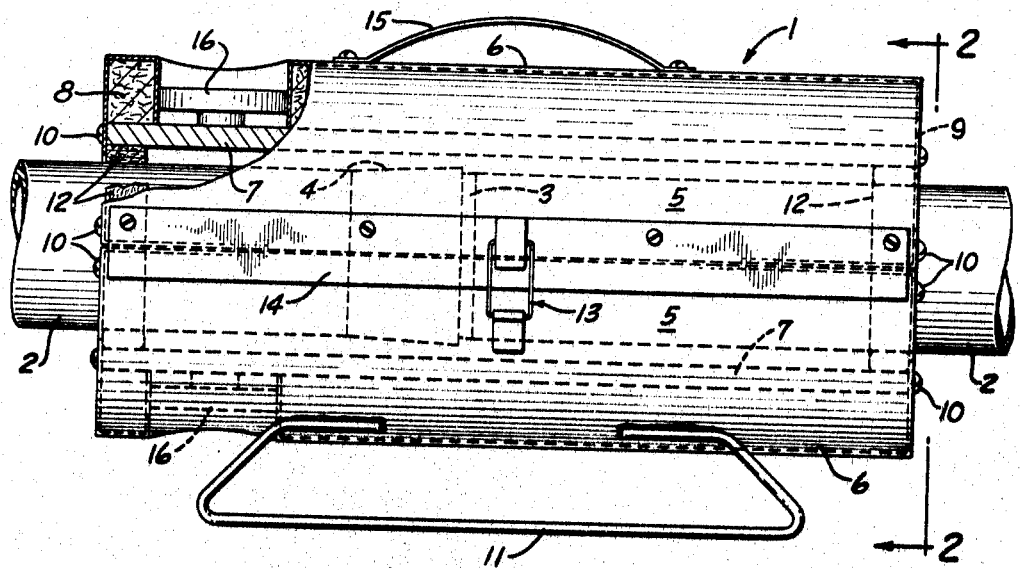
FIG. 1 is a side elevation of the heating device as used to cure the joint between a pair of plastic pipe sections.

The drawings illustrate a heating device 1 for curing the adhesive joint between plastic pipe sections 2. While the type of joint to be used between the pipe sections 2 is not critical, the drawing illustrates a conventional bell and spigot joint. One of the pipe sections is provided with a tapered end 3 which is inserted with an enlarged bell end 4 of the other pipe section. The resin adhesive to be cured is applied to the outer surface of the tapered end 3 as well as the inner surface of the bell end 4 and on curing of the resin a tight joint is provided between the two pipe sections.

Figure 2:
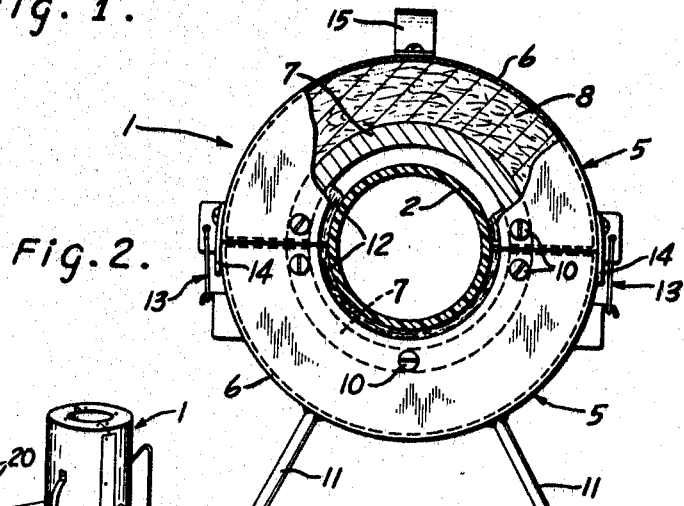
FIG. 2 is a transverse section taken along line 2—2 of FIG. 1.

The heating device 1 is composed of two longitudinally-split halves 5, with each half including an outer semi-cylindrical casing 6 and an inner semi-cylindrical metal heating section 7 separated by a layer of heat insulating material 8. As best shown in FIG. 2, the casing 6 extends across the edges of the insulating layer 8 and heating section 7, as indicated by 9, and is secured to the inner surface of the heating section 7 by a series of screws 10.

The halves 5 are formed of relatively thick metal and function as a heat sink to store and transfer heat to the pipe sections 2. In order to reduce the weight of the unit so that it can be more easily handled and transported, the halves can be formed of aluminum.

The lower half 5 is supported from the ground by a pair of legs 11 which are secured to the casing 6.

To prevent the pipe sections 2 from coming into direct physical contact with the heating section 7, a pair of semi-circular heat insulating spacers 12 are secured to the inner surface of each heating section 7 adjacent each end of the heating section. The spacers 12 are formed of a heat insulating material, such as asbestos or the like, and serve to prevent direct contact between the pipe sections 2 and the heating sections 7, thereby eliminating any possibility of scorching or decomposition of the plastic pipe sections.

The two halves 5 of the heating unit are adapted to be locked together by latches 13 which are located on either side of the heating device. In addition, a wind screen 14 is secured to each side of the upper half 5 and extends downwardly over the joint between the two halves when the halves are latched together. The wind screen 14 extends the length of the heating device and prevents the wind from blowing into the joint or crack between the two halves, thereby preventing heat loss to the atmosphere. The semi-circular spacers 12 which extend circumferentially throughout the extent of the heating sections 7 function in a similar manner at the ends of the heating device to prevent the wind from blowing into the device at the ends.

A handle 15 is connected to the upper half 5 which enables the unit to be conveniently carried or moved.

As shown in the drawings, the heating device 1 is not provided with an integral heating source, but instead is heated by an auxiliary gas heating unit. A thermometer 16 is located within a recess in the casing 6 of each half 5, and each thermometer 16 is connected to the respective heating section 7 to provide an indication of the outer surface temperature of the heating section. The temperature of the outer surface of heating section 7 can be calibrated to give the temperature of the inner surface, if desired.

Figure 3:
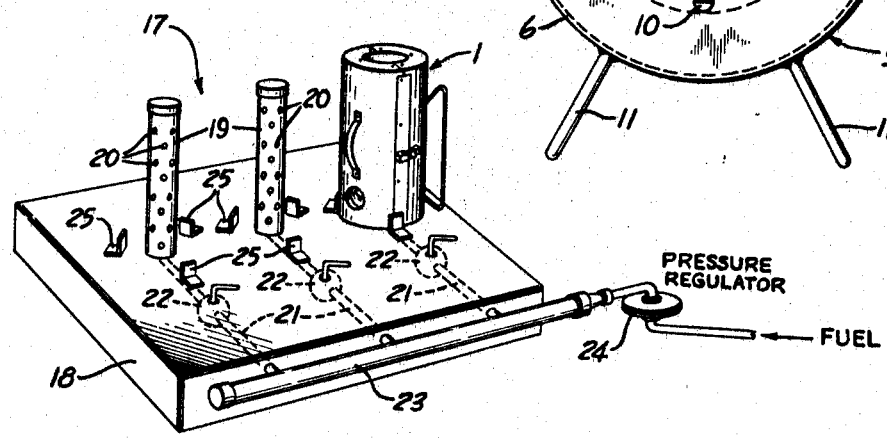
FIG. 3 is a perspective view showing the gas heater with a heating device of the invention being preheated thereon.

The gas heating unit 17 which is employed to preheat the heating sections 7 is best shown in FIG. 3, and includes a generally rectangular base 18 having a plurality of vertical gas pipes 19 with each pipe having a series of openings or jets 20. The lower end of each pipe 19 is connected to a gas line 21 located within base 18 and a valve 22 is connected in each gas line 21. The gas lines 21 in turn are connected to a manifold 23 which communicates with a source of gas, not shown. A conventional pressure regulator 24 is connected in the manifold 23 and provides the required uniform gas pressure for the gas heater.

To heat the heating device 1 prior to the insertion of the pipe section 2, the halves 5 are latched together by the latches 13 and the device is inserted vertically over one of the gas pipes 19 with the heating sections 7 being spaced from the jets 20. Guides 25 extend upwardly from the upper surface of the base 18 and serve to properly position the heating device so that the heating sections 7 are uniformly spaced around the gas pipe 19. When the metal heating sections 7 have been heated to the proper temperature, which generally is in the range of 300 to 600° F. as indicated by the thermometers 16, the heating device 1 is removed from the gas pipe, the latches 13 are opened and the lower half 5 is placed on the ground. The pipe sections 2, the ends of which have been joined together with the resin adhesive, are then positioned on the lower half 5 with the pipe joint approximately midway between the ends of the device. As previously mentioned, the pipe sections 2 are not in contact with the heating section 7 which is at a temperature of about 300 to 600° F. due to the spacers 12. The upper half 5 is then positioned over the pipe sections 2 and latched to the lower half by latches 13. The wind screens 14 prevent the wind from blowing through the longitudinal joint between the halves and the semi-circular spacers 12 prevent the wind from entering the ends of the device. As the heating sections 7 are formed of relatively thick metal, they serve as heat sinks and will retain their heat for a substantial period of time, sufficient to effect an accelerated cure of the resin adhesive.

As the resin adhesive between the pipe sections 2 is cured by radiant heating from the heating sections 7 and as there is no direct contact between the heating sections 7 and the pipe sections, the problem of scorching or decomposition of the plastic pipe is eliminated. As no heat is supplied directly to the heating sections 7 while the heating device surrounds the pipe sections, there can be no problem of overheating and the unit can be left unattended.

The heating device of the invention is a small, inexpensive, portable unit which is used in the field for applying heat to the adhesive joint between plastic pipe sections and particularly joints between fiber reinforced thermosetting resin pipe sections. The device is particularly adapted for use in the field when the ambient temperature falls below 60° F. to accelerate the curing cycle for the resin adhesive. However, the heating device also hastens the curing cycle of the resin adhesive at ambient temperatures, thereby enabling the joined pipe sections, or other tubular members, to be put into service more quickly.

While the drawings illustrate the use of the heating device in joining of bell and spigot pipe sections, the heating device can also be utilized to aid in curing other types of adhesive bonded joint constructions. Similarly, the invention can be used for bonding many types of tubular members other than pipe sections, such as fittings, couplings, etc.

In the above description, a separate gas heating unit 17 was used to heat the heating device 1. However, other types of auxiliary heaters can be substituted for the gas heating unit, and it is also contemplated that the heating unit can be formed integrally with the halves 5.

I claim:

1. A heating device for curing the adhesive joint between plastic tubular articles, comprising a tubular heating member capable of absorbing substantial quantities of heat and adapted to receive the articles to be joined, said tubular member having a larger internal diameter than the external diameter of the articles, and insulating means connected to the internal surface of the tubular member and projecting radially inward from said tubular member, said insulating means extending longitudinally over only a minor portion of said internal surface, said insulating means disposed to engage the outer surface of at least one of the articles and spacing the articles from the tubular member and preventing direct contact therebetween, whereby said adhesive joint is heated radiantly by said tubular member.

2. The heating device of claim 1, in which the tubular member is composed of a plurality of longitudinally split heating sections.

3. The heating device of claim 2 and including means for locking the heating sections together in spaced relation around said pipe sections.

4. The heating device of claim 1 in which the tubular member is formed of two longitudinally split halves and said insulating means is semi-circular in shape and is connected to both end portions of each half.

5. The heating device of claim 2 and including means connected to at least one of said heating sections for enclosing the longitudinal joint between said heating sections and preventing wind from blowing through said longitudinal joint.

6. The heating device of claim 4 and including a flap attached to one of said halves and extending over the joint between said halves, said flap extending substantially the length of said heating device and preventing wind from blowing in through said joint between the halves.

7. The heating device of claim 4 and including a generally semi-cylindrical casing spaced outwardly of each of said halves, and a layer of insulating material located between each casing and the respective half.

8. The heating device of claim 7 and including temperature indicating means located on each casing for indicating the temperature of the respective half.

9. The heating device of claim 2, in which said heating sections are formed of relatively thick metal to serve as a heat sink, and a layer of heat insulating material is disposed on the outer surface of each heating section to minimize dissipation of the heat from said heating sections to the atmosphere.

10. The heating device of claim 9, in which the metal is aluminum.

11. The heating device of claim 1, wherein said insulating means comprises a pair of longitudinally spaced insulating rings disposed adjacent the ends of said tubular member.

References Cited

UNITED STATES PATENTS

| | | | |
|---|---|---|---|
| 3,022,209 | 2/1962 | Campbell | 156—158 |
| 3,035,958 | 5/1962 | Wilkins | 156—311 XR |

HAROLD ANSHER, Primary Examiner

M. E. McCAMISH, Assistant Examiner

U.S. Cl. X.R.

156—503, 583